(12) United States Patent
Chen

(10) Patent No.: US 12,008,091 B2
(45) Date of Patent: Jun. 11, 2024

(54) SINGLE INPUT VOICE AUTHENTICATION

(71) Applicant: Cisco Technology, Inc., San Jose, CA (US)

(72) Inventor: Eric Yi-Hua Chen, Irvine, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 900 days.

(21) Appl. No.: 17/018,150

(22) Filed: Sep. 11, 2020

(65) Prior Publication Data

US 2022/0083634 A1 Mar. 17, 2022

(51) Int. Cl.
| | |
|---|---|
| G06F 21/32 | (2013.01) |
| G06F 16/635 | (2019.01) |
| G06V 40/50 | (2022.01) |
| G10L 15/26 | (2006.01) |

(52) U.S. Cl.
CPC ............ *G06F 21/32* (2013.01); *G06F 16/636* (2019.01); *G06V 40/50* (2022.01); *G10L 15/26* (2013.01)

(58) Field of Classification Search
CPC ........................................................ G06F 21/32
See application file for complete search history.

(56) References Cited

U.S. PATENT DOCUMENTS

| | | | |
|---|---|---|---|
| 6,510,415 B1 | 1/2003 | Talmor et al. | |
| 10,049,673 B2* | 8/2018 | Kurian | G10L 17/02 |
| 10,074,089 B1* | 9/2018 | Rangaraj | G06Q 20/40145 |
| 10,102,359 B2* | 10/2018 | Cheyer | H04L 63/10 |
| 10,235,509 B2* | 3/2019 | Goldstein | G06F 16/636 |
| 10,255,419 B1* | 4/2019 | Kragh | G06F 21/32 |
| 10,310,723 B2* | 6/2019 | Rathod | G06F 3/0481 |
| 10,325,603 B2* | 6/2019 | Li | G10L 17/14 |
| 10,896,673 B1* | 1/2021 | Garner, IV | G06F 21/32 |
| 11,140,581 B2* | 10/2021 | Oyman | H04W 28/22 |
| 11,757,870 B1* | 9/2023 | Garner, IV | H04W 12/63 726/7 |
| 2014/0343943 A1* | 11/2014 | Al-Telmissani | G06F 21/32 704/246 |
| 2016/0292408 A1* | 10/2016 | Zhang | G06F 21/32 |
| 2017/0221488 A1* | 8/2017 | Xiong | G10L 17/02 |
| 2018/0151182 A1* | 5/2018 | Wyss | G10L 17/10 |
| 2018/0152445 A1* | 5/2018 | Ye | G10L 17/24 |
| 2018/0308491 A1* | 10/2018 | Oktem | G10L 15/07 |

(Continued)

OTHER PUBLICATIONS

Markowitz, Judith, "Voice Biometrics", https://www.researchgate.net/publication/27293606, Communications of the ACM, Sep. 2000, 18 pages.

(Continued)

*Primary Examiner* — Viral S Lakhia
(74) *Attorney, Agent, or Firm* — Edell, Shapiro & Finnan, LLC

(57) ABSTRACT

A system and method for authenticating a user via a single voice audio input is disclosed. The method includes obtaining voice audio from a user, converting the voice audio to text, comparing at least a portion of the text to a database, determining whether a user profile exists in the database based on the comparing, the user profile including a voiceprint, in response to determining that the user profile exists in the database, analyzing the voice audio against the voiceprint of the user profile; and authenticating the user based on the voice audio substantially matching the voiceprint of the user profile.

20 Claims, 6 Drawing Sheets

(56) References Cited

U.S. PATENT DOCUMENTS

| | | | | |
|---|---|---|---|---|
| 2019/0114405 A1* | 4/2019 | Shibata | .................. | G06F 21/32 |
| 2019/0228780 A1* | 7/2019 | Athias | ..................... | G06F 21/32 |
| 2020/0342083 A1* | 10/2020 | Goldstein | .............. | H04W 4/21 |

OTHER PUBLICATIONS

Voiceit Technologies, LLC, "Voiceit FAQ", https://voiceit.io/faq, downloaded Jul. 13, 2020, 2 pages.

ID R&D Inc., "IDVoice™ TD", Text Dependent Voice Verification, https://www.idmnd.ai/text-dependent-voice-verification/, downloaded Jul. 13, 2020, 6 pages.

Barbu, Tudor et al., "A Text-dependent Voice Recognition Approach Using the Spectral Distance", downloaded Jul. 13, 2020, 4 pages.

Nuance Communications, Inc., "My voice is my password", https://www.nuance.com/en-gb/omni-channel-customer-engagement/security/multi-modal-biometrics/vocalpassword.html?wgu=8415_16644_15891582540411_623e35035f&wgexpiry=1596934254&pgmid=52895700%E2%80%A6, downloaded Sep. 11, 2020, 3 pages.

Sensory Inc., "Face & Voice Biometrics", https://www.sensory.com/face-voice-biometrics/?cn-reloaded=1, downloaded Sep. 11, 2020, 5 pages.

Nuance Communications, Inc., "The most natural way to authenticate: Biometric authentication using speech", https://www.nuance.com/omni-channel-customer-engagement/security/multi-modal-biometrics/freespeech.html?wgu=8415_16644_15891596337393_087e9b347f&wgexpiry=1596935633&pgmid=52895700&cid=701%E2%80%A6, downloaded Sep. 11, 2020, 4 pages.

Aculab, "VoiSentry Biometric Speaker Verification", https://www.voisentry.com/use-cases/?doing_wp_cron=1599830956.9429459571838378906250, downloaded Sep. 11, 2020, 7 pages.

Trevorbye et al., "What is Speaker Recognition?", https://docs.microsoft.com/en-us/azure/cognitive-services/speech-service/speaker-recognition-overview, Sep. 2, 2020, 5 pages.

VoiceIt API 2.0, "User Token Authentication", API Reference, https://api.voiceit.io/#authentication, downloaded Sep. 11, 2020, 31 pages.

Badvertised, "Sneakers (1992): My Voice Is My Passport", https://www.youtube.com/watch?v=-zVgWpVXb64, Jun. 10. 2013, 1 page.

* cited by examiner

SINGLE INPUT VOICE AUTHENTICATION

TECHNICAL FIELD

The present disclosure relates to the field of voice authentication and, in particular, to single input voice authentication for a multi-user system.

BACKGROUND

Computing systems (e.g., computers, mobile devices, smart phones, tablets, workstations, virtual assistants, networks etc.) have become an integral part of businesses, hospitals, restaurants, and the like. Accordingly, multiple users, e.g., employees, managers, officer, etc., access various computing equipment/devices associated with a system, network, enclosed space, vending device, etc., to carryout tasks. Many businesses share devices between users. Typically, the devices require a user identification ("ID") and passcode to allow access to the computing equipment/device while maintaining security of the computing system and/or enclosed space.

Some systems use voice authentication to allow a user to access a device. The voice authentication compares a voice input with a voiceprint stored in a user profile. In systems with very few users sharing an interface device, user ID's may be acceptable because the system can quickly compare an audio input from a user with a few stored voiceprints. However, in systems with multiple users, comparing a voice input of a user with multiple voiceprints stored in multiple profiles may be time-consuming and negatively affect user authentication performance.

DESCRIPTION OF EXAMPLE EMBODIMENTS

Overview

Figure 1:
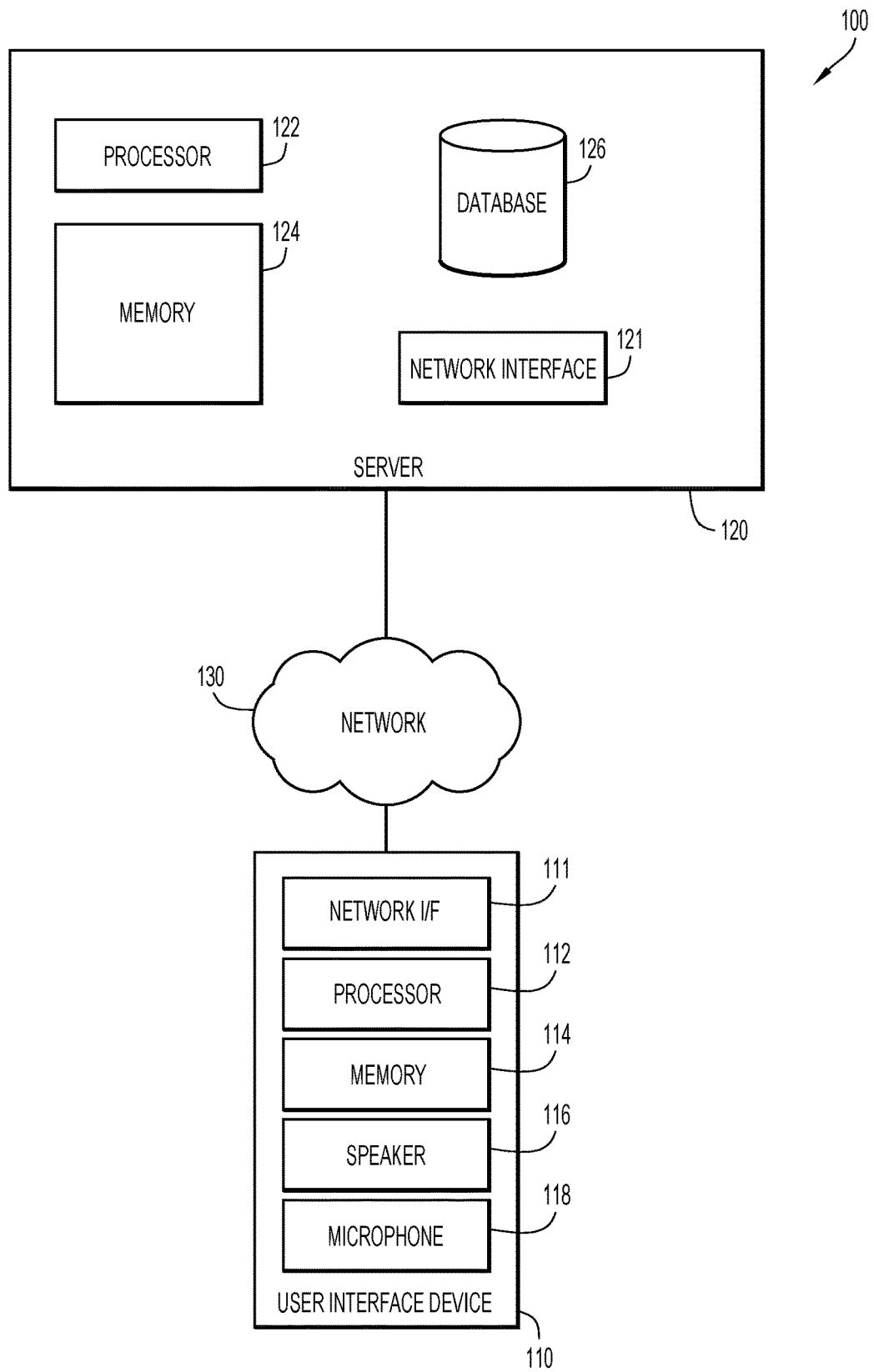
FIG. 1 is a diagram of a system for single input voice authentication system, according to an exemplary embodiment.

A method for authenticating a user with a single voice input is presented herein. The method includes obtaining voice audio from a user, converting the voice audio to text, comparing at least a portion of the text to a database, determining whether a user profile exists in the database based on the comparing, the user profile including a voiceprint, in response to determining that the user profile exists in the database, analyzing the voice audio against the voiceprint of the user profile, and authenticating the user based on the voice audio substantially matching the voiceprint of the user profile.

Example Embodiments

Typically, voice authentication systems configured to voice-authenticate multiple users request multiple voice (audio) inputs from a given user to authenticate the given user. For example, a user may provide a voice input to initiate the system, a voice input for identification, and a voice input for voice authentication at a user interface device shared by multiple users. The voice authentication system must analyze each input against numerous user profiles in a system to authenticate a user, and then reply to each input. If each of user's voice inputs are verified, the system authenticates the user. If even one of the user's voice inputs fails to be verified, for example, due to an error in the system's analysis, the input not matching any stored user profiles, or an improper input by the user, the system requests the user to repeat at least a portion of the login process. The login process continues until the user provides the proper voice inputs and the system properly analyzes each of the voice inputs, or until the user is locked out of the system. Providing multiple voice inputs each time a user attempts to login and access a locked device can negatively affect the user interface device's processing resources and be time consuming for the user, negatively affecting the user's efficiency.

Generally, the system and method for single input voice authentication as presented herein includes combining speech-to-text ("STT"), natural language understanding ("NLU") and text-independent voice authentication, to allow single input voice-based authentication. That is, the system can recognize, or determine, a desired user from a group of known users, and authenticate the user in response to a single voice input from the user. The system includes a user interface device for receiving a user voice (audio) input and a processor for converting the user voice input into text. The system determines a login intent from the text, extracts the user's ID from the text, and determines a user profile based on the ID extracted from the text. The user profile contains a voiceprint of audio of a particular user. The system stores a plurality of user profiles, one for each user that has enrolled with the system for authentication. The user voice input is then compared to the voiceprint from the user profile that matches the ID extracted from the text. In response to the user voice (audio) input matching the voiceprint, the system provides the user access to the device and/or system. Thus, a system may recognize and authenticate a user from a plurality of users through a single voice input. This effectively turns a multi-class model (e.g., "who is this user?") into a binary-class model (e.g., "is this really the user?") with one voice audio input from the user, and thus, may be scaled without impacting reliability.

Now referring to FIG. 1, a description is provided of an exemplary embodiment of a system 100 for single input voice authentication of a user. The system 100 is illustrated as including a user interface device 110 and a server 120. The user interface device 110 and the server 120 may be directly connected or may be connected via a network 130. The user interface device 110 includes a network interface 111, a processor 112, a memory 114, a speaker 116, and a microphone 118. While the user interface device 110 includes speaker 116, embodiments are not limited thereto. In some implementations, the user interface device 110 may include a display (e.g., liquid-crystal display ("LCD"), or light-emitting diode screens, and the like) for providing information to a user. In some implementations, the user interface device 110 may further include a manual input device (e.g., mouse, joystick, keypad, keyboard, etc.) for receiving inputs from a user. In some implementations the user interface device 110 may be a computing device, a vending apparatus, a workstation, a mobile device, a smart phone, a tablet, and/or a virtual assistant. The user interface device 110 may provide a user with access to a network, memory, and/or software/apps/applications running on the user interface device 110, software running on a server in the cloud, etc. In some implementations, the user interface device 110 may be a smart lock or control a lock for a room, a vault, an enclosed space, a video conference endpoint, etc.

The server 120 includes network interface 121, a processor 122, a memory 124, and a database 126. While database 126 is shown as being part of server 120, embodiments are not limited thereto. In some implementations, the database 126 may be separate from the server 120 and the server 120 may communicate with the database 126 via the network 130 and/or user interface device 110. While one server 120 is shown in FIG. 1, embodiments are not limited thereto. The system 100 may include more than one instance of server 120.

The network 130 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Network 130 is capable of transmitting data. The network 130 can also comprise base stations, controller nodes, telephony switches, internet routers, network gateways, computer systems, communication links, or some other type of communication equipment, and combinations thereof. In some implementations, the user interface device 110 may be configured to access and communicate with the server 120 via the network 130. In some implementations, the user interface device 110 may communicate with one or more elements, servers, and/or devices connected to the network 130.

In operation, the user interface device 110 authenticates a user in response to a single voice input. For example, the microphone 118 of user interface device 110 may receive audio from a user. The user interface device 110 converts the audio to digital audio data representing the audio captured by the microphone 118, and may transmit the digital audio data to the server 120 to authenticate the user. In some implementations, the processor 112 of the user interface device 110 may perform the operations of the processor 122 of the server to authenticate the user based on the audio signal. In response to authenticating the user, the user interface device 110 provides the user access to one or more resources (computing, storage, network, applications, etc.) to which the user is entitled to access.

Figure 2:
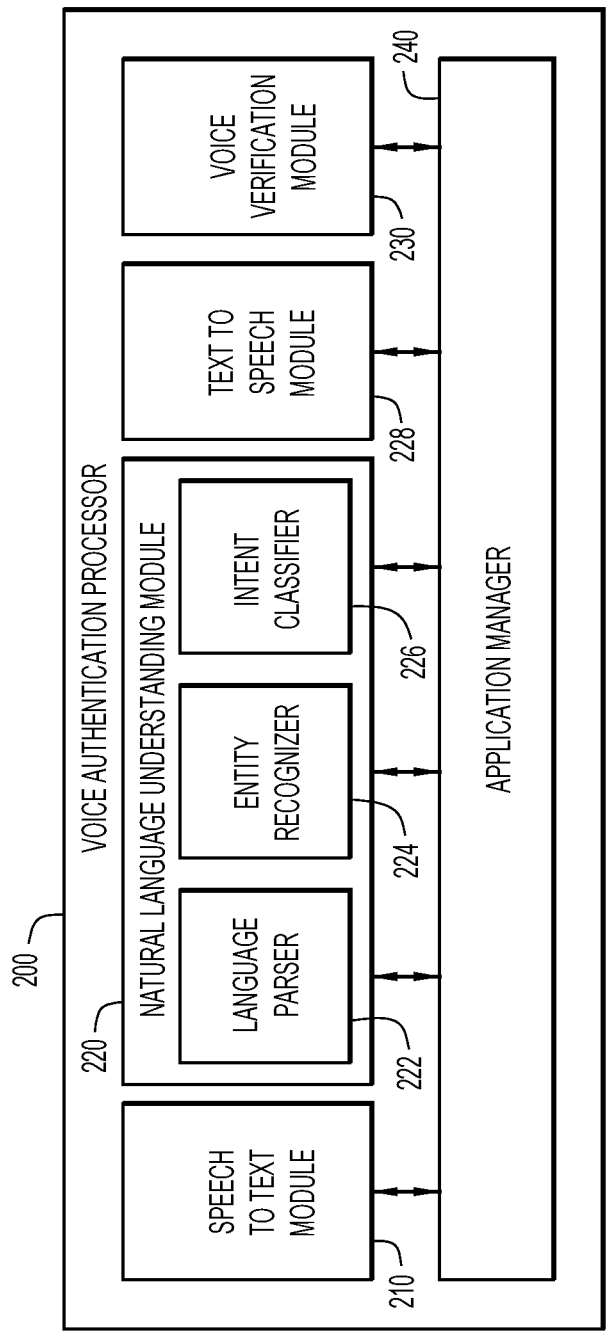
FIG. 2 is a diagram of a single input voice authentication processor, according to an exemplary embodiment.

FIG. 2 illustrates a voice authentication processor ("VAP") 200. The VAP 200 may be representative of processor 112 of the user interface device 110 and/or processor 122 of the server 120; however, embodiments are not limited thereto. The VAP 200 includes a speech-to-text ("STT") module 210, a natural language understanding ("NLU") module 220, a text-to-speech ("TTS") module 228, a voice verification module 230, and an application manager 240. The NLU module 220 includes a language parser 222, an entity recognizer 224, and an intent classifier 226.

The STT module 210 is configured to convert a received digital audio data (derived from captured audio) to text. The NLU module 220 is configured to parse the text by the language parser 222, recognize entities from the parsed text by the entity recognizer 224, and determine an intent from the parsed text by the intent classifier 226. The TTS module 228 is configured to convert text into digital audio that can be converted to an audio signal that may be understood by a user (e.g., a human) as speech. That is, the TTS module generates digital audio that, when converted to an audio signal that is output by a speaker, may be audible by a user. The voice verification module 230 is configured to compare digital audio data derived from a captured audio signal to pre-recorded voiceprints of one or more users. The application manager 240 is configured to manage and transmit information between the STT module 210, NLU module 220, the language parser 222, the entity recognizer 224, intent classifier 226, and voice verification module 230. Many known STT, NLU, and TTS modules have been developed and are available. The STT module, NLU module and TTS module may be implemented using any known modules, e.g., Kaldi for STT, MindMeld for NLU, and MaryTTS, Mimic and/or Voice Builder for TTS.

Figure 3:
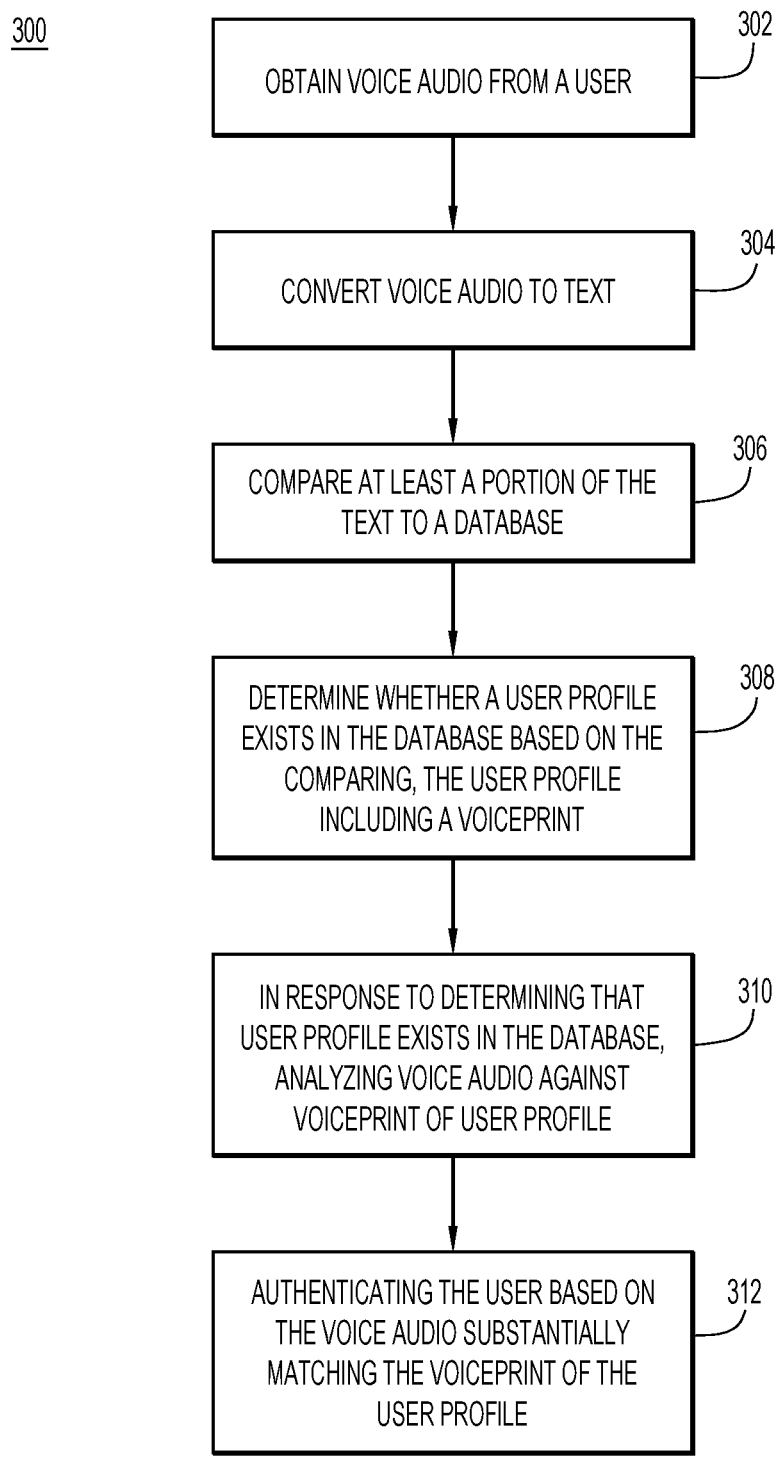
FIG. 3 is a flow chart illustrating a method for single input voice authentication, according to an exemplary embodiment.

FIG. 3 illustrates a method 300 for authorizing a user. The method includes obtaining voice audio from a user seeking authentication, in operation 302, converting the voice audio to text in operation 304, comparing at least a portion of the text to a database in operation 306, determining whether a user profile exists in the database based on the comparing, the user profile including a voiceprint in operation 308, in response to determining that the user profile exists in the database, analyzing the voice audio against the voiceprint of the user profile in operation 310, and authenticating the user based on the voice audio substantially matching the voiceprint of the user profile in operation 312. FIG. 3 is a high-level method description, and further details are now described in connection with FIGS. 4 and 5.

Figure 4:
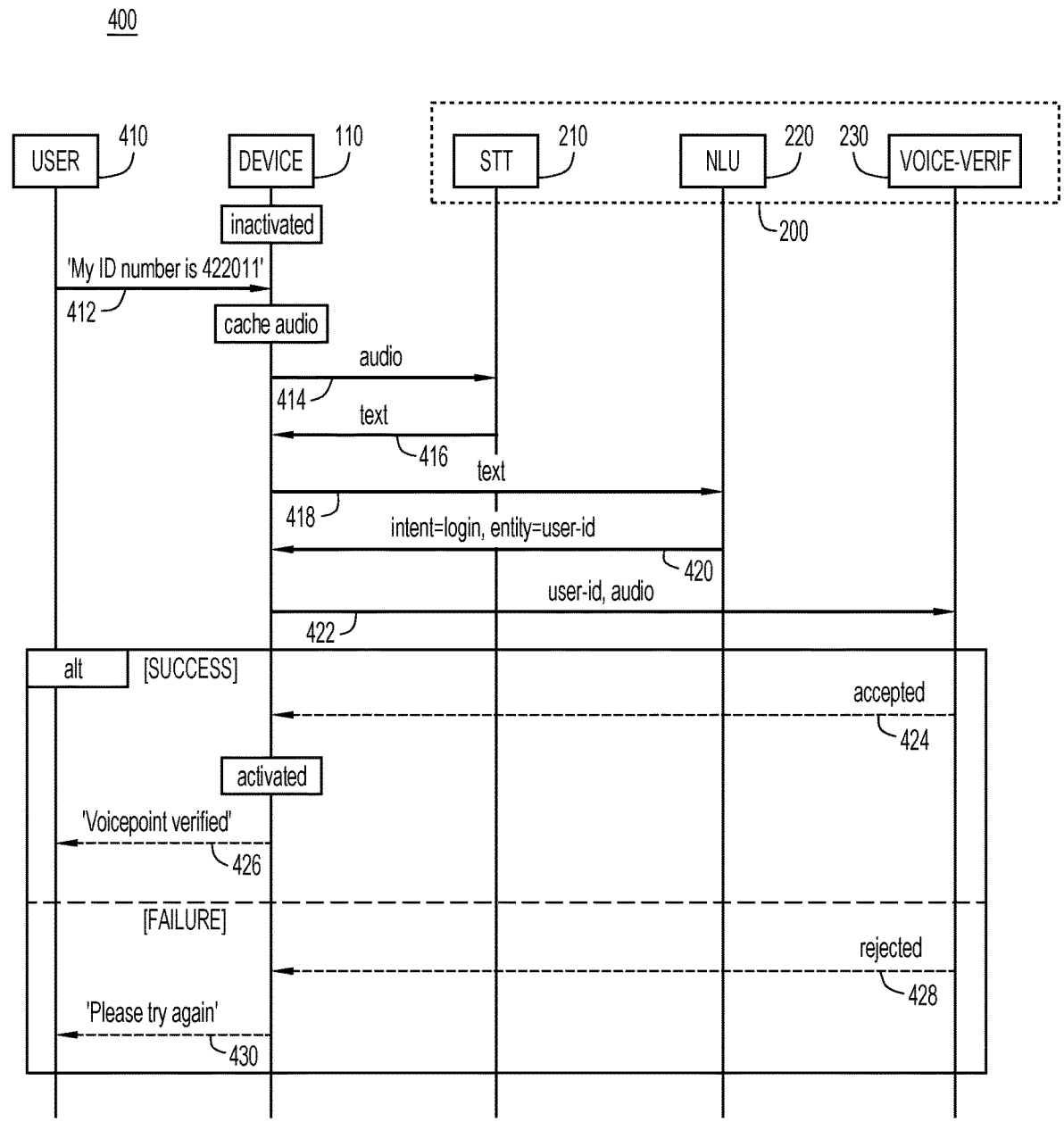
FIG. 4 illustrates a sequence diagram of a process for authorizing a user based on a single voice input, according to an exemplary embodiment.

FIG. 4 illustrates an example operational sequence 400 for authenticating a user 410 in response to a single voice audio input. The user 410 interacts with user interface device 110. The user interface device 110 interacts with modules of the voice authentication processor 200, including the STT module 210, NLU module 220, and voice verification module 230, referred to above in connection with FIG. 2.

In operation 412, the device 110 receives voice audio input from user 410. As an example, the device 110 receives, via a microphone (e.g., microphone 118), an audio passphrase spoken by the user. For example, a user may say "my ID number is 422011". The device 110 caches, or stores, the audio signal, or input, captured by the microphone. In operation 414, digital audio data derived from the voice audio is transmitted to the STT module 210. In operation 416, the STT module 210 converts the digital audio data to text. In operation 418, the text is transmitted to the NLU module 220. In operation 420, the NLU module 220 determines an intent and entity from the text. For example, the NLU module 220 may determine the intent of the user's utterance is to log into a resource and the entity to be logged in is the user corresponding to the ID number from the user's utterance.

In operation 422, the user-ID and digital audio data are transmitted to the voice verification module 230. The voice verification module 230 determines whether a user profile corresponding to the user-ID extracted from the text exists, or is present, among a plurality of user profiles stored in a database (e.g., database 126). Each of the user profiles stored in the database includes an identification code and one or more voiceprints of a corresponding user for voice verification. For example, the voice verification module 230 compares the received user-ID data to a plurality identification codes corresponding to the plurality of user profiles stored in the database. In response to finding an identification code in the database that matches the received user-ID, the voice verification module 230 determines the user-ID exists. In response to not finding an identification code that matches the received user-ID, the voice verification module 230 determines the user-ID does not exist, or is not present in the database.

In response to determining the user profile corresponding to the user-ID exists, the voice verification module 230 obtains the user profile containing the stored voiceprint corresponding to the user-ID and compares the digital audio data of the captured voice audio to the stored voiceprint. In response to the captured voice audio substantially matching the stored voiceprint corresponding to the user-ID, the voice verification module 230 transmits an acceptance indication to the device 110 in operation 424. In response to the acceptance indication, the device 110 provides the user access to a resource. In operation 426, the device 110 outputs an indication that the voiceprint is verified and that the user is authenticated. For example, the device 110 may output an audible signal via a speaker, and/or visual signal via a display, indicating that the user's identity is verified. In some implementations, the device may indicate that access has been granted.

Additionally, or alternatively, in response to the voice verification module 230 determining that the user-ID does not exist or the digital audio data does not match the voiceprint stored in the profile corresponding to the user-ID, a rejection indication is transmitted to the device 110 in operation 428. Thus, the user is not authenticated. For example, the voice verification module 230 may determine that the user-ID does not exist and may transmit a rejection indication without further analyzing the digital audio data against the plurality of voiceprints stored in the database. Alternatively, if the voice verification module 230 determines that the user-ID does exist in the database, but the digital audio data does not match voiceprint stored in the profile corresponding to the user-ID, the voice verification module 230 may determine the authentication has failed and transmits the rejection indication to the user interface device 110.

In operation 430, the device 110 outputs an indication that the voiceprint is not verified, or authenticated. For example, the device 110 may output an audio signal via a speaker, or a visual signal via a display, indicating that the user's verification failed, and requests that the user try again. Further, the device 110 may prevent access to a resource by the user.

In some implementations the acceptance/rejection indications may be transmitted to a text-to-speech ("TTS") module 228 for converting the indication into speech. The TTS module 228 may transmit the generated speech to the device 110 for output by the speaker 116.

While the device 110, the STT module 210, the NLU module 220, and the voice verification module 230 are shown separately, embodiments are not limited thereto. In some implementations, the STT module 210, the NLU module 220, and the voice verification module 230 may be combined as a single device, e.g., processor 122 of server 120 of FIG. 1. In some implementations, the functions of the STT module 210, the NLU module 220, and voice verification module 230 are integrated within the device 110, e.g., processor 112 of user interface device 110 of FIG. 1. In some implementations, the NLU module 220 includes a text-to-speech module.

Figure 5:
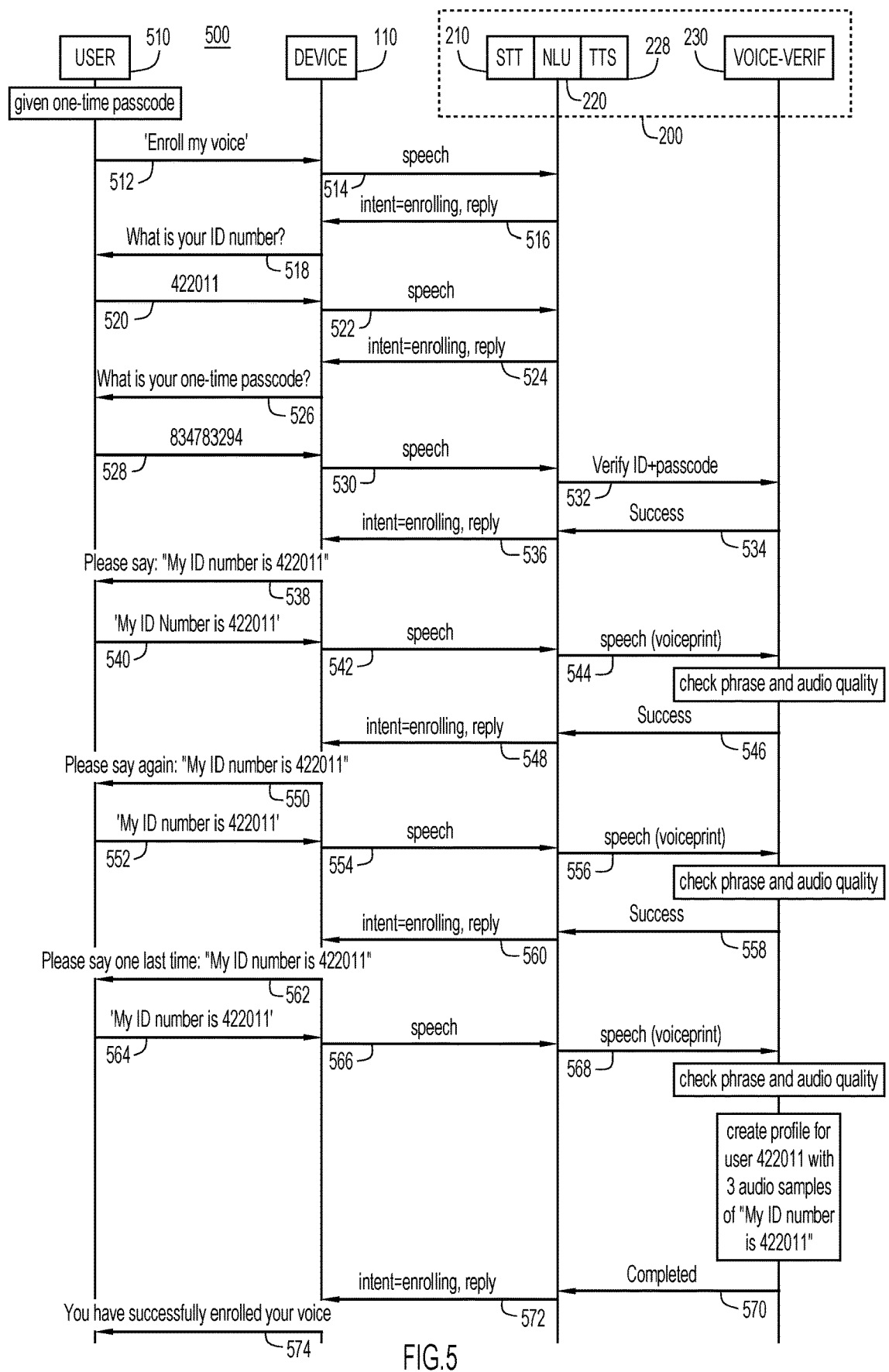
FIG. 5 illustrates a sequence diagram for enrolling a user with an authentication system, according to an exemplary embodiment.

FIG. 5 illustrates an example operational sequence 500 for enrolling a user 510 as an authenticated user, according to an embodiment. The user 510 interacts with user interface device 110. The user interface device 110 interacts with modules of the voice authentication processor 200, including the STT module 210, NLU module 220, the TTS module 228, and voice verification module 230, referred to above in connection with FIG. 2.

In operation 512, the operational sequence 500 is initiated in response to receiving an audio input from user 510. For example, the device 110 receives, via a microphone, an audible enrollment phrase spoken by the user 510. For example, the user 510 may say "enroll my voice" and the device 110 may capture the user's utterance with a microphone.

In operation 514, digital audio data derived from the voice audio is transmitted to the STT module 210. The STT module 210 converts the digital audio data to text and transmits the text to the NLU module 220. The NLU module 220 parses the text and determines an intent from the parsed text. The NLU module 220 generates a reply based on the intent and transmits the reply to the TTS module 228. For example, the generated reply may be "what is your ID number?"

In operation 516, the TTS module 228 converts the generated reply to speech and transmits the reply to the device 110 to be output by a speaker 116. In operation 518, the device 110 outputs the reply as an audible output from the speaker 116. In some implementations, the device 110 outputs the text of the reply as a visual output on a display.

In operation 520, the device 110 receives and captures voice audio corresponding to a user-ID spoken by the user 510. The user-ID may be previously provided to the user 510. For example, the microphone 118 of the device 110 may receive the spoken user-ID, e.g., "422011", from the user's speech. That is, the user 510 may say "422011" and the microphone 118 receives and captures the audio signal of the spoken user-ID.

In operation 522, digital data derived from the voice audio corresponding to the user-ID is transmitted to the STT module 210. The STT module 210 converts the digital audio data to text. The NLU module 220 parses the text and determines an intent from the parsed text. For example, the NLU module 220 may determine the intent is enrolling the user 510.

In operation 524, the NLU module 220 generates a reply based on the determined intent and transmits the reply to the TTS module 228 to convert the generated reply to speech. For example, the generated reply may be "what is your one time passcode?" The speech corresponding to the reply is transmitted from the TTS module 228 to the device 110. At instance 526, the device 110 outputs the reply as an audible output from the speaker 116. In some implementations, the device 110 outputs the text of the reply as a visual output on the display.

In operation 528, the device 110 receives voice audio corresponding to a one-time passcode from the user 510. The one-time passcode may be previously provided to the user 510. For example, the microphone 118 of the device 110 may receive and capture the one-time passcode, e.g., "834783294", spoken by the user 510. That is, the user 510 may say "834783294" and the microphone receives and captures the audio signal of the spoken passcode.

In operation 530, the device 110 transmits digital audio data derived from the captured voice audio to the STT module 210. The STT module converts the digital audio data to text. In operation 532, the text corresponding to the one-time passcode and the user-ID number is transmitted to the voice verification module 230 for verification.

In operation 534, the voice verification module 230 verifies the one-time passcode and user-ID and transmits a success notification to the NLU module 220. For example, the voice verification module 230 compares the user-ID to a database, e.g., database 126, of one or more user-IDs. Each of the user-IDs corresponds to a one-time passcode. The voice verification module 230 obtains the one-time passcode matching the user-ID provided by the user 510. The voice verification module 230 compares the one-time passcode provided by the user 510 to the one-time passcode corresponding to the user-ID. In response to the one-time passcodes matching, the voice verification module 230 transmits a success indication to the NLU module 220.

Based on the success of the verification, the NLU module 220 may determine an intent to enroll the user corresponding to the user-ID and generates a reply. For example, the reply may be the instructions for the user 510, e.g., "please say: 'my ID number is 422011.'" The TTS module 228 converts the reply text generated by the NLU module 220 to speech. In operation 536, the speech is transmitted to the device 110. In operation 538, the device 110 audibly outputs the speech through the speaker 116. In some implementations, the device 110 outputs the text of the generated by the NLU module 220 via a display.

In operation 540, the device 110 receives voice audio from the user 510 via the microphone 118 in response to outputting the instructions. For example, in response to receiving the instructions from the device 110, the user 510 says "my ID number is 422011." The device 110 captures the voice audio corresponding to the user's speech and transmits digital audio data derived from the captured voice audio to the NLU module 220. The NLU module 556 determines the digital audio data is intended as a voiceprint and transmits the digital audio data to the voice verification module 230 in operation 542. In operation 544, the voice verification module 230 determines whether the quality of the digital audio data meets a desired threshold. In operation 546, the voice verification module 230 stores the digital audio data as a first voiceprint and transmits a success indication to the NLU module 220 in response to the digital audio data meeting the desired threshold.

In operation 548, the NLU module 220 generates instructions for the user to repeat the passphrase. For example, the instructions may be "please say again: 'my ID number is 422011.'" The TTS module 228 generates speech corresponding to the instructions, and transmits the generated speech to the device 110. In operation 550, the device 110 receives the generated speech, and audibly outputs the received speech to the user 510 via the speaker 116. In some implementations, the device 110 outputs the text generated by the NLU module 220 via the display.

Operations 552-568 iteratively repeat operations taken at instances 536-548. That is, the voice authentication processor 200 and device 110 instructs the user to repeat the passphrase two more times, and captures the user's speech. The digital audio data derived from captured voice audio of the user's speech are stored as second and third voiceprints. In some implementations, the operations 536-568 are repeated until a desired number of voiceprint samples of a desired quality are obtained.

In operation 570, the voice verification module 230 creates a user profile corresponding to the user-ID with the three sample voiceprints. For example, a profile corresponding to user-ID number "422011" is created with the three sample voiceprints of the spoken passphrase from the user 510. The user profile with sample voiceprints is stored in a database, e.g., database 126. The voice verification module 230 transmits a completion signal indicative of completion of the user enrolling process. While the user profile includes three sample voiceprints, embodiments are not limited thereto. The stored user profile may include less than three or more than three sample voiceprints of the user's speech.

In operation 572, the NLU module 220 determines that the enrollment is complete and generates a reply in response to receiving the completion signal from the voice verification module 230. For example, the generated reply may be "you have successfully enrolled your voice". The TTS module 228 converts the reply to speech. In operation 574, in response to receiving the reply, the device 110 audibly outputs the speech via the speaker 116. In some implementations, the device 110 outputs the text generated by the NLU module 220 on the display.

While the device 110, the STT module 210, the NLU module 220, the TTS module 228, and the voice verification module 230 are shown separately, embodiments are not limited thereto. In some implementations, the STT module 210, the NLU module 220, the TTS module 228, and the voice verification module 230 may be combined as a single device, e.g., processor 122 of server 120 of FIG. 1. In some implementations, the functions of the STT module 210, the NLU module 220, the TTS module 228, and the voice verification module 230 are integrated within the user interface device 110, e.g., processor 112 of user interface device 110 of FIG. 1.

Figure 6:
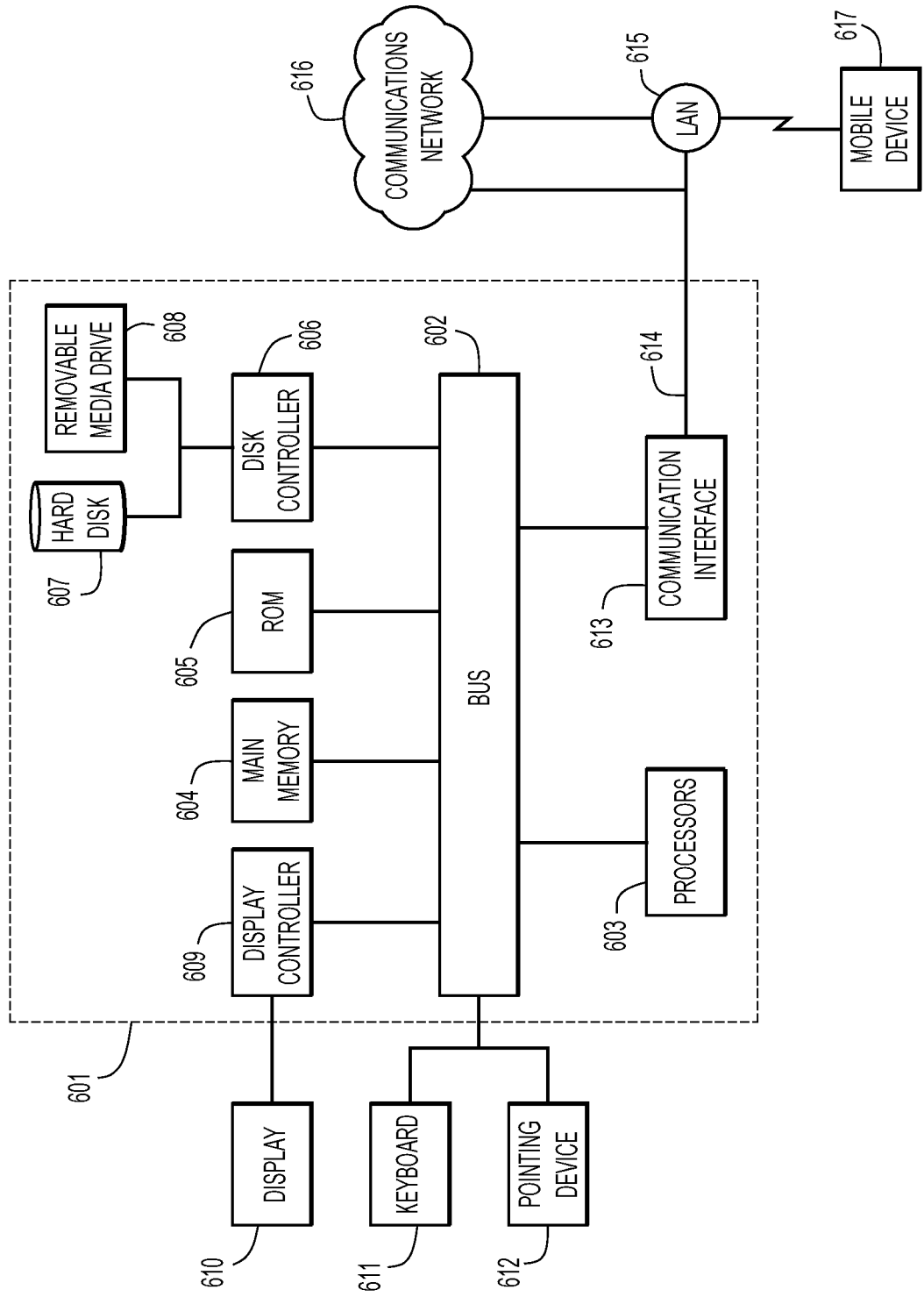
FIG. 6 illustrates a computer system configured to perform the single input voice authentication processes, according to an exemplary embodiment.

FIG. 6 illustrates a computer system 601 upon which the embodiments presented may be implemented. The computer system 601 may be programmed to implement a computer based device, such as a video conferencing endpoint or any device includes a video encoder or decoder for processing real time video images. The computer system 601 includes a bus 602 or other communication mechanism for communicating information, and a processor 603 coupled with the bus 602 for processing the information. While the figure shows a single block 603 for a processor, it should be understood that the processors 603 represent a plurality of processing cores, each of which can perform separate processing. The computer system 601 also includes a main memory 604, such as a random access memory (RAM) or other dynamic storage device (e.g., dynamic RAM (DRAM), static RAM (SRAM), and synchronous DRAM (SD RAM)), coupled to the bus 602 for storing information and instructions to be executed by processor 603. In addition, the main memory 604 may be used for storing temporary variables or other intermediate information during the execution of instructions by the processor 603.

The computer system 601 further includes a read only memory (ROM) 605 or other static storage device (e.g., programmable ROM (PROM), erasable PROM (EPROM), and electrically erasable PROM (EEPROM)) coupled to the bus 602 for storing static information and instructions for the processor 603.

The computer system 601 also includes a disk controller 606 coupled to the bus 602 to control one or more storage devices 607 for storing information and instructions, such as a magnetic hard disk or solid state drive, and a removable media drive 608 (e.g., floppy disk drive, read-only compact disc drive, read/write compact disc drive, removable magneto-optical drive and optical storage drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA), or any other technologies now known or hereinafter developed.

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 601 may also include a display controller 609 coupled to the bus 602 to control a display 610, such as a Liquid Crystal Display (LCD), Light Emitting Diode (LED) display, or other now known or hereinafter developed display technologies, for displaying information to a computer user. The computer system 601 includes input devices, such as a keyboard 611 and a pointing device 612, for interacting with a computer user and providing information to the processor 603. The pointing device 612, for example, may be a mouse, a trackball, a pointing stick or a touch-pad, for communicating direction information and command selections to the processor 603 and for controlling cursor movement on the display 610. The display 610 may be a touch-screen display.

The computer system 601 performs a portion or all of the processing steps of the process in response to the processor 603 executing one or more sequences of one or more instructions contained in a memory, such as the main memory 604. Such instructions may be read into the main memory 604 from another computer readable medium 607, such as a hard disk or solid state drive or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

Stored on any one or on a combination of non-transitory computer readable storage media (e.g., magnetic or optical mediums, magneto-optic mediums, CD-ROM, DVD, memory devices, etc.), embodiments presented herein include software for controlling the computer system 601, for driving a device or devices for implementing the process, and for enabling the computer system 601 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a wired or wireless network interface card to attach to any packet switched (wired or wireless) LAN. As another example, the communication interface 613 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local area network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

Additionally, terms such as "transmit" and "receive" are broadly used herein to refer to techniques for providing and obtaining data in network environments. For example, data may be provided and obtained through packets transmitted and received through a network (e.g., network 130 FIG. 1). Data may also be provided and obtained through data communicated via out-of-band signaling or control channels used in a network environment (e.g., network 130 of FIG. 1).

According to an example embodiment, a method for authenticating a user includes obtaining voice audio from a user, converting the voice audio to text, comparing at least a portion of the text to a database, determining whether a user profile exists in the database based on the comparing, the user profile including a voiceprint, in response to determining that the user profile exists in the database, analyzing the voice audio against the voiceprint of the user profile; and authenticating the user based on the voice audio substantially matching the voiceprint of the user profile.

In one form of the method, the obtaining includes obtaining voice audio that includes a user identification code.

In one form of the method, the method further includes determining a login intent of the user based on text, wherein the determining whether the user profile exists is responsive to determining the login intent.

In one form of the method, the method further includes storing in the database user profiles for each of a plurality of users that are enrolled for voice authentication, each user profile including a user identification code associated with a respective user and a voiceprint for the respective user.

In one form of the method, the method further includes extracting the user identification code from the text derived from the voice audio, wherein comparing includes comparing the user identification code against the database, and wherein determining whether the user profile exists includes attempting to retrieve from the database the user profile that matches the user identification code.

In one form of the method, the method further includes in response to determining that a user profile that matches the user identification code does not exist in the database, rejecting authentication of the user.

In one form of the method, the method further includes based on the authenticating, allowing the user to access a resource that includes at least one of: a computing device, a network, a vending apparatus, a workstation, a mobile device, a smart phone, a tablet, a virtual assistant, a room, a vault, a video conference endpoint, and an enclosed space.

According to another example embodiment, an apparatus is provided that includes a non-transitory computer readable storage medium and a processor. The processor is configured to obtain voice audio from a user, convert the voice audio to text, compare at least a portion of the text to a database, determine whether a user profile exists in the database based on the comparing, the user profile including a voiceprint, in response to determining that user profile exists in the database, analyzing the voice audio against the voiceprint of the user profile; and authenticate the user based on the voice audio substantially matching the voiceprint of the user profile.

In one form of the apparatus, the apparatus further includes a user interface including a microphone and a speaker.

In one form of the apparatus, the processor is configured to obtain voice audio that includes a user identification code.

In one form of the apparatus, the processor is further configured to determine a login intent of the user based on the text, and to determine whether the user profile exists is responsive to determining the login intent.

In one form of the apparatus, the non-transitory computer readable storage medium is configured to store the database, the database comprising user profiles for each of a plurality of users that are enrolled for voice authentication, each user profile including a user identification code associated with a respective user and a voiceprint for the respective user.

In one form of the apparatus, the processor is configured to extract the user identification code from the text derived from the voice audio, to compare at least a portion of the text to a database by comparing the user identification code against the database, and determine whether the user profile exists by attempting to retrieve from the database the user profile that matches the user identification code.

In one form of the apparatus, the processor is further configured to, based on authenticating the user, allow the user to access a resource that includes: a computing device, a network, a vending apparatus, a workstation, a mobile device, a smart phone, a tablet, a virtual assistant, a video conference endpoint, a room, a vault, or an enclosed space.

According to yet another example embodiment, one or more non-transitory computer readable storage media encoded with instructions that, when executed by a processor, cause the processor to perform operations including: obtaining voice audio from a user, converting the voice audio to text, comparing at least a portion of the text to a database, determining whether a user profile exists in the database based on the comparing, the user profile including a voiceprint, in response to determining that user profile exists in the database, analyzing the voice audio against the voiceprint of the user profile, and authenticating the user based on the voice audio substantially matching the voiceprint of the user profile.

In one form of the device, the obtaining includes obtaining voice audio that includes a user identification code.

In one form of the device, the instructions further cause the processor to determine a login intent of the user based on the text, wherein the determining the user profile exists is responsive to determining the login intent.

In one form of the device, the one or more non-transitory storage media further include the database, the database comprising user profiles for each of a plurality of users that are enrolled for voice authentication, each user profile including a user identification code associated with a respective user and a voiceprint for the respective user.

In one form of the device, the instructions further cause the processor to extract the user identification code from the text derived from the voice audio, wherein comparing at least a portion of the text to a database includes comparing the user identification code against the database, and wherein determining whether the user profile exists includes attempting to retrieve from the database the user profile that matches the user identification code stored in the database.

In one form of the device, the instructions further cause the processor to, based on the authenticating, allow the user to access a resource that includes: a computing device, a network, a vending apparatus, a workstation, a mobile device, a smart phone, a tablet, a virtual assistant, a video conference endpoint, a room, a vault, or an enclosed space.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   obtaining voice audio from a user;
   converting the voice audio to text;
   determining an attempt to access a resource based on the text;
   determining an identifier included in the text;
   comparing the identifier to a plurality of identifiers stored in a database in response to determining the identifier, wherein each identifier of the plurality of identifiers corresponds to a respective user profile in the database;
   retrieving a user profile based on the user profile corresponding to the identifier stored in the database, the user profile including a voiceprint;
   in response to retrieving the user profile, comparing the voice audio to the voiceprint of the user profile;
   authenticating the user based on the voice audio substantially matching the voiceprint of the user profile; and
   providing access to the resource in response to authenticating the user.

2. The method of claim 1, wherein the identifier includes a user identification code.

3. The method of claim 1, further comprising:
   obtaining additional voice audio from an additional user;

converting the additional voice audio to additional text;
determining an additional attempt to access an additional resource based on the additional text;
determining an additional identifier included in the additional text;
comparing the additional identifier to the plurality of identifiers stored in the database in response to determining the additional identifier;
determining the additional identifier does not correspond to any of the plurality of identifiers;
in response to determining the additional identifier does not correspond to any of the plurality of identifiers stored in the database, rejecting authentication of the additional user; and
blocking access to the additional resource in response to rejecting authentication of the additional user.

4. The method of claim 1, wherein the resource includes at least one of: a computing device, a network, a vending apparatus, a workstation, a mobile device, a smart phone, a tablet, a virtual assistant, a room, a vault, a video conference endpoint, and an enclosed space.

5. The method of claim 1, further comprising:
performing an enrollment operation to store the identifier of the user and the user profile corresponding to the identifier in the database.

6. The method of claim 5, further comprising:
initiating the enrollment operation in response to receipt of a user input.

7. The method of claim 6, wherein the user input comprises an initial voice audio.

8. The method of claim 5, further comprising:
receiving a plurality of sample voice audios from the user during the enrollment operation; and
generating the voiceprint for the user profile based on the plurality of sample voice audios.

9. The method of claim 8, wherein the generating of the voiceprint for the user profile based on the plurality of sample voice audios is in response to each sample voice audio of the plurality of sample voice audios comprising the identifier.

10. The method of claim 5, further comprising:
receiving an initial voice audio during the enrollment operation;
converting the initial voice audio to initial text;
extracting the identifier from the initial text; and
storing the identifier extracted from the initial text.

11. The method of claim 10, further comprising:
generating a passcode in response to receiving the initial voice audio;
receiving a user input;
determining the user input includes the passcode; and
storing the identifier in response to determining the user input includes the passcode.

12. The method of claim 11, wherein the user input comprises additional initial voice audio, and the method further comprises:
converting the additional initial voice audio to additional initial text;
comparing the additional initial text to the passcode; and
determining the user input includes the passcode based on the additional initial text matching the passcode.

13. The method of claim 11, further comprising:
generating the passcode based on the identifier extracted from the initial text.

14. An apparatus comprising:
a non-transitory computer readable storage medium; and
a processor configured to:
obtain voice audio from a user;
convert the voice audio to text;
determine a login attempt based on the text;
determine an identifier included in the text;
compare the identifier to a plurality of identifiers stored in a database in response to determining the identifier, wherein each identifier of the plurality of identifiers corresponds to a respective user profile in the database;
retrieve a user profile based on the user profile corresponding to the identifier stored in the database, the user profile including a voiceprint;
in response to retrieving the user profile, compare the voice audio to the voiceprint of the user profile;
determine the voice audio substantially matches the voiceprint; and
allow the login attempt based on the voice audio substantially matching the voiceprint of the user profile.

15. The apparatus of claim 14, further comprising a user interface comprising a microphone and a speaker.

16. The apparatus of claim 14, wherein the non-transitory computer readable storage medium is configured to:
store the database.

17. The apparatus of claim 14, wherein the processor is configured to extract the identifier from the text converted from the voice audio.

18. One or more non-transitory computer readable storage media encoded with instructions that, when executed by a processor, cause the processor to perform operations including:
obtaining voice audio from a user;
converting the voice audio to text;
determining a request to access a resource based on the text;
extracting an identifier included in the text;
comparing the identifier to a plurality of identifiers stored in a database in response to extracting the identifier, wherein each identifier of the plurality of identifiers corresponds to a respective user profile in the database;
retrieving a user profile based on the user profile corresponding to the identifier stored in the database, the user profile including a voiceprint;
in response to retrieving the user profile, comparing the voice audio to the voiceprint of the user profile; and
providing access to the resource based on the voice audio substantially matching the voiceprint of the user profile.

19. The one or more non-transitory computer readable storage media of claim 18, wherein the database is stored on the one or more non-transitory computer readable storage media.

20. The one or more non-transitory computer readable storage media of claim 18, wherein the resource includes: a computing device, a network, a vending apparatus, a workstation, a mobile device, a smart phone, a tablet, a virtual assistant, a video conference endpoint, a room, a vault, or an enclosed space.

* * * * *

UNITED STATES PATENT AND TRADEMARK OFFICE
CERTIFICATE OF CORRECTION

| | | |
|---|---|---|
| PATENT NO. | : 12,008,091 B2 | Page 1 of 1 |
| APPLICATION NO. | : 17/018150 | |
| DATED | : June 11, 2024 | |
| INVENTOR(S) | : Eric Yi-hua Chen | |

It is certified that error appears in the above-identified patent and that said Letters Patent is hereby corrected as shown below:

On the Title Page

Item (72) Inventor: please replace "Eric Yi-Hua Chen" with --Eric Yi-hua Chen--

Signed and Sealed this
Twenty-second Day of October, 2024

*Katherine Kelly Vidal*

Katherine Kelly Vidal
*Director of the United States Patent and Trademark Office*